Nov. 15, 1938.    B. G. COOPER    2,136,938
TROLLEY CURRENT COLLECTOR
Filed Dec. 11, 1937
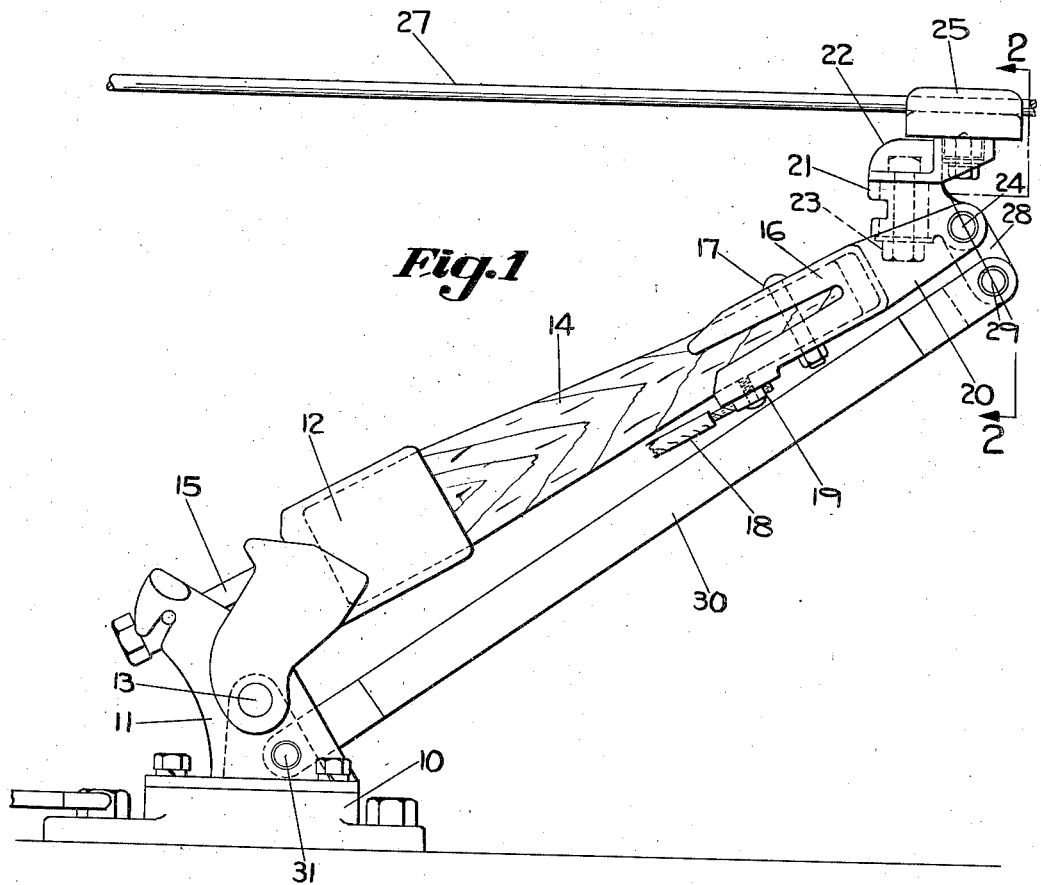
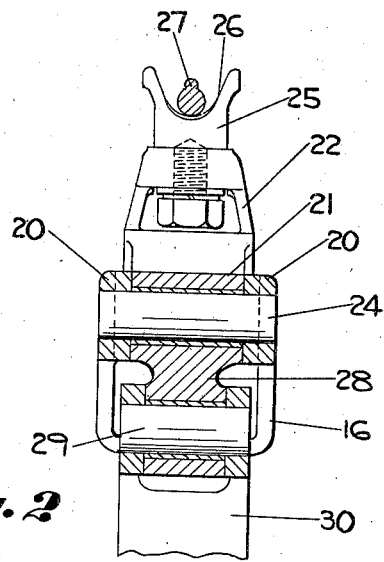
INVENTOR:
BENJAMIN G. COOPER,
BY
Chas. M. Nissen,
ATTY.

Patented Nov. 15, 1938

2,136,938

UNITED STATES PATENT OFFICE 2,136,938

TROLLEY CURRENT COLLECTOR

Benjamin G. Cooper, Columbus, Ohio, assignor to The Jeffrey Manufacturing Company, a corporation of Ohio Application December 11, 1937, Serial No. 179,350

2 Claims. (Cl. 191—59.1)

This invention relates to a trolley current collector and an object of the invention is to provide such a device including a non-rotary collecting shoe which is held with a current collecting surface substantially horizontal as said shoe moves vertically.

Other objects of the invention will appear hereinafter, the novel features and combinations being set forth in the appended claims.

In the accompanying drawing,

Fig. 1 is a side elevational view of the device comprising my invention; and

Fig. 2 is a sectional view taken on the line 2—2 of Fig. 1 looking in the direction of the arrows.

It has been found in practice that where the sliding or non-rotary type of collector shoes are employed to collect current from a trolley wire there is a tendency for the trolley wire contacting area of the shoe to wear very unevenly due to the sliding frictional forces which tend to rotate the shoe, which tendency is particularly noticeable in the wearing away of the shoe along the trailing edge. The device comprising my invention maintains the sliding surface of the shoe against such rotary movement and requires it to move in parallelism with said surface substantially horizontal at all times as said shoe moves upwardly and downwardly in response to variations in the height of the trolley wire.

As illustrated in Figs. 1 and 2 of the drawing, the trolley current collector comprising my invention is formed by a base 10 which is rigidly attached to the car or locomotive to which the current is to be conducted. Mounted for rotation about an upright axis upon the base 10 is a yoke 11 to which is pivotally attached for movement about a horizontal axis a bottom socket 12 pivoted to said yoke 11 by a pin 13 and receiving the bottom portion of a trolley pole 14. The trolley pole 14 and the socket 12 are urged to rotate in a counter-clockwise direction about the pivot pin 13 by spring mechanism including a bolt 15 trunnioned in the yoke 11, which mechanism preferably takes the form of the trolley mechanism disclosed in the patent to Nils D. Levin, No. 1,199,283 dated September 26, 1916.

Adjacent its upper end the trolley pole 14 carries an upper socket 16 which is removably attached to said pole by a bolt 17 and has connected thereto an electric cable 18 by clamping means 19. The upper end of the socket 16 provides a yoke formed by spaced side plates 20, 20 between which is pivoted a casting or carrier 21 by a horizontal pin 24 to which is attached for pivotal movement about an upright axis a harp 22 pivotally attached thereto by an upwardly extending bolt 23.

Rigidly but removably attached to the upper end of the harp 22 is a sliding or non-rotary current collecting shoe 25 having a smooth longitudinally extending groove 26 presenting an appreciable bearing area which makes sliding contact with a trolley wire 27.

It is to be noted that contact between the trolley wire 27 and the bottom of groove 26 is along a substantially horizontal line and the object of the invention is to maintain the shoe 25 in parallelism with the position illustrated regardless of any vertical movement thereof. In other words, to insure a maximum contact area between the shoe 25 and the trolley wire 27 and thus to provide for even wearing on the shoe and a minimum of wear on the trolley wire and shoe it is desirable to maintain a maximum of contacting area therebetween at all times. This is accomplished by the structure of my invention.

Formed as an integral portion of the casting or carrier 21 and extending downwardly from the pin 24 is a lever or arm 28 which is pivotally attached by a pin 29 to a link 30, the lower end of which is pivotally attached by a pin 31 to the yoke 11. It is to be noted that the yoke 11, trolley pole 14, lever or arm 28 and link 30, together with the pins 13, 24, 29 and 31, form a parallel link mechanism in that the distances between the axes of pins 13 and 31 on the one hand and pins 24 and 29 on the other are equal and in that the distances between the axes of pins 13 and 24 on the one hand and 29 and 31 on the other hand, are equal.

It is thus evident that as shoe 25 moves upwardly and downwardly to accommodate itself to the varying height of the trolley wire 27 it will be maintained in a substantially horizontal position at all times, thus insuring the maximum contacting area between the trolley wire 27 and the groove 26 of said shoe 25 at all times. As above pointed out, this greatly prolongs the life of the shoe 25 as well as the life of the trolley wire 27 because the wear on each is maintained at a minimum.

It is also to be noted that by virtue of the pivotal connection provided between the carrier 21 and the harp 22 by the pivot bolt 23 said shoe 25 is pivotally mounted about an upright axis which is always substantially vertical.

This parallel motion mechanism is of particular importance where a sliding shoe 25 is employed as distinguished from a roller because the problem of making contact over an extended longitudinally extending area of the trolley wire is presented by a sliding shoe but not by the rolling contact afforded by a trolley wheel.

Obviously those skilled in the art may make various changes in the details and arrangement of parts without departing from the spirit and scope of the invention as defined by the claims hereto appended, and I therefore wish not to be restricted to the precise construction herein disclosed.

Having thus described and shown an embodiment of my invention, what I desire to secure by Letters Patent of the United States is:

1. In a current collector, the combination with a base, of a trolley pole pivoted thereto on a horizontal axis, a non-rotary current collecting shoe having a substantially horizontally extending concave trolley wire contacting area in the top thereof, means rigidly attached to said shoe and pivotally connecting said shoe to the upper end of said trolley pole, a link pivotally connected at one end to said base and at the other end to said means, said pivotally connected members forming a positive parallel motion mechanism constructed and arranged to maintain said shoe horizontal during upward and downward movement thereof.

2. In a current collector, the combination with a base, of a pair of upwardly inclined links including a trolley pole pivoted to said base on parallel horizontal axes, an arm pivotally mounted on the upper end of said links cooperating therewith to form a positive parallel motion mechanism, a non-rotary current collecting shoe having a substantially horizontally extending concave trolley wire contacting area in the top thereof, and means connecting said shoe for movement with said arm and providing for pivotal movement between them on a vertical axis, said mechanism maintaining said shoe horizontal during movement thereof.

BENJAMIN G. COOPER.